April 6, 1937. J. W. HAYES ET AL 2,076,235
GAS PURIFICATION
Filed Oct. 21, 1933
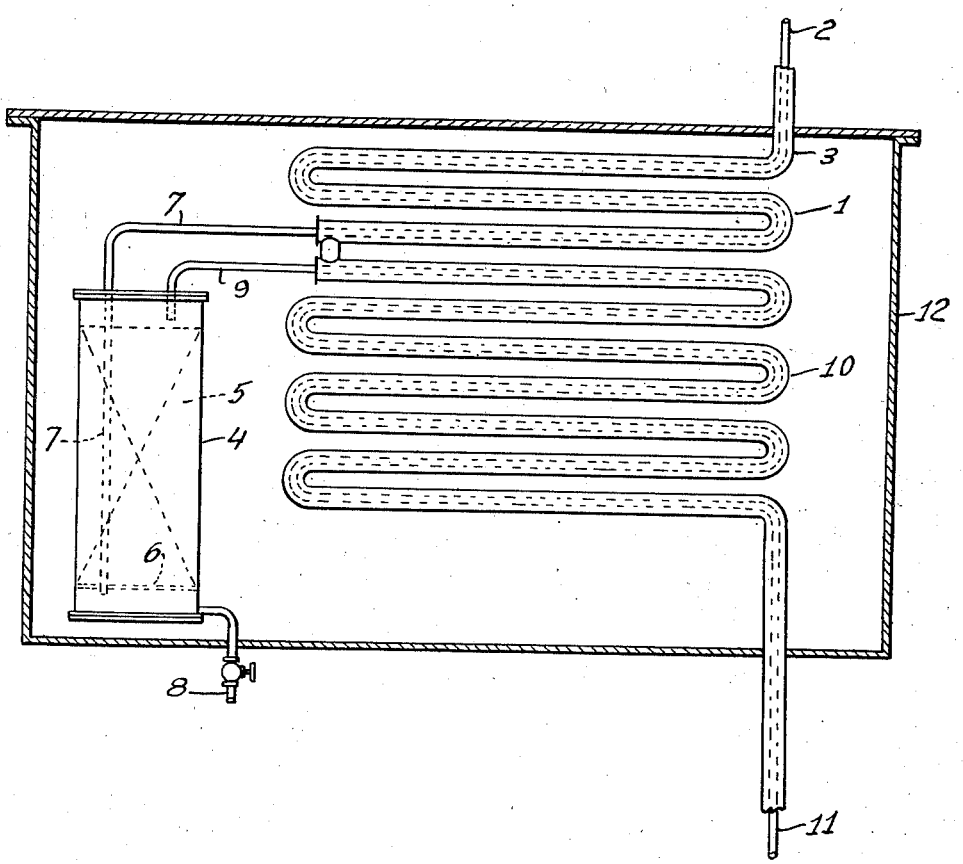
INVENTORS
John W. Hayes
Alois J. Kallfelz
BY
ATTORNEY Patented Apr. 6, 1937

2,076,235

UNITED STATES PATENT OFFICE 2,076,235

GAS PURIFICATION

John W. Hayes and Alois J. Kallfelz, Syracuse, N. Y., assignor to The Solvay Process Company, New York, N. Y., a corporation of New York Application October 21, 1933, Serial No. 694,605

3 Claims. (Cl. 62—175.5)

This application relates to the production of chlorine and is especially directed to the preparation of chlorine relatively free from impurities.

In the manufacture of chlorine, in particular liquid chlorine, it is desirable that there should be present as small an amount of impurities as possible. Gaseous chlorine, when prepared by the usual methods of manufacture, for instance by electrolysis, may contain traces of moisture, organic products liberated at the electrode, and other impurities formed by the corrosive action of the chlorine gas on lubricants and valve packings and other materials with which it comes in contact during its course of manufacture and transportation. Liquid chlorine prepared by liquefaction of such a product ordinarily contains these impurities. In order to minimize the corrosive action of liquid chlorine so that it may be shipped in ordinary iron containers, such as tank cars and cylinders, it is desirable that the chlorine be as free from impurities as possible.

The present invention is directed to a method for the removal of such impurities from the chlorine prior to its liquefaction.

When chlorine gas is progressively cooled to a low temperature, it has been found that the condensation of such impurities takes place at a considerably higher temperature than the condensation of chlorine itself. In accordance with the present invention gaseous chlorine is cooled first to a low temperature above its liquefaction point at the pressure at which it is maintained, so as to fractionally condense out impurities contained therein. The resultant condensate may be removed from the chlorine gas by baffle or contact means, for instance by passing the gas through a packed tower or baffle chamber. The chlorine thus purified may then be further cooled to effect its liquefaction. The percent of such impurities removed in accordance with our process has amounted in some instances to as much as 93 or 94% of the total quantity originally present.

In order that a better understanding may be had of the purification of chlorine in accordance with the present invention, a description thereof will be given in connection with the accompanying drawing representing diagrammatically a combination of apparatus suitable for carrying out the process.

In the drawing, numeral 1 represents a cooling coil into which chlorine gas may be introduced by means of inlet 2. The cooling coil 1 is provided with cooling means, in the present case consisting of a concentric pipe 3 through which a cooling fluid flows. Numeral 4 represents a separating chamber that may be a tower packed with glass, Raschig rings, broken tile, or other suitable packing 5, adapted to present a large contact surface to the gas passing therethrough without unduly retarding its flow. This packing may be supported by a suitable grid 6 as shown to space the packing from the floor of the tower. From coil 1 the pipe 7 is provided extending down through the packed tower 4 and having an open end so that the chlorine gas may pass out of the pipe and up through the packing 5. The tower 4 may be provided with an outlet 8 for removing condensate therefrom. The pipe 9 connects the top of the tower with a second cooling coil 10 similar to cooling coil 1 and adapted to further cool the chlorine gas and produce liquid chlorine. An outlet 11 is provided for the removal of the liquid chlorine.

The entire cooling and purification apparatus may be contained in an insulating chamber 12 which may be filled with cork or other suitable heat insulation (not shown).

In order to prepare liquid chlorine by means of this apparatus, gaseous chlorine is introduced through inlet 2 to coil 1. The flow of cooling fluid in pipe 3 is suitably controlled so that the temperature of the chlorine gas is lowered to around $-20°$ C. in its passage through this coil. At this temperature the impurities mentioned will at least to a large extent be in the liquid and/or solid phase and will be carried along with the chlorine stream as a liquid and/or solid mist. The chlorine gas stream carrying this mist is delivered through pipe 7 into the contact chamber 4 wherein the mist is separated out from the gas. The percentage of mist contained in the gas is usually quite small and accordingly it may be necessary to remove this condensate by means of outlet 8 only at rare intervals.

The chlorine gas which is still at a temperature of around $-20°$ C. is lead by means of pipe 9 into a second cooling coil 10 wherein its temperature is further reduced to around $-40$ to $-50°$ C. At this temperature the chlorine readily liquefies at atmospheric pressure and consequently may be removed through outlet 11 in a liquid condition, from which it may be introduced into cylinders or tank cars or other storage or conveying means as desired.

The following examples illustrate the efficiency of removal of non-volatile impurities from chlorine by this method.

Each of three chlorine gas samples was cooled with and without the purification step and the percentage non-volatile content of each liquid chlorine product was then determined. Results of these determinations are as follows:

| | Percent of non-volatile content in liquid chlorine | |
|---|---|---|
| | A. Without purification | B. With purification |
| 1 | .0024 | .0004 |
| 2 | .0027 | .0005 |
| 3 | .0031 | .0002 |

In a commercial installation where the average percentage of non-volatile matter in the liquid chlorine had been around .006, the insertion of a purification step, such as above described, reduced the percentage of non-volatile matter in liquid chlorine subsequently produced with otherwise the same equipment to around .0026, a reduction in the content of impurities of nearly 60 per cent.

The scrubber used for this purification was a chamber 12 inches in diameter and 52 inches high filled with one inch porcelain Raschig rings and connected in the manner illustrated in the drawing, with an installation producing around five hundred pounds of liquid chlorine per hour. Under these conditions of operation little additional head was required for the scrubber, the pressure drop through the packing being only 2 or 3 pounds.

It will be evident from the above description that the process of the present invention is capable of effecting a very substantial reduction in the content of non-volatile impurities in chlorine. It will be understood, however, that the invention is not limited to the specific method of operation described as illustrative since the various features of the process may be varied in many ways as will be evident to those skilled in the art.

In general the first cooling step should lower the temperature of the chlorine below about 30 centigrade degrees above the liquefaction temperature at the operating pressure, and it is preferred that the first cooling step should lower the temperature of the chlorine nearly to but slightly above the liquefaction temperature of the chlorine itself, which may be around —32° C. It has been found that temperatures between about —20 and about —25° C. (7° to 12° C. above liquefaction temperature) result in an adequate removal of the impurities.

The cooling method used may be any of those normally employed for liquefying chlorine, it merely being necessary that the cooling medium be capable of adequately lowering the temperature of the chlorine. As examples of such cooling media may be mentioned an alcohol and carbon dioxide snow bath and also ammonia refrigeration means.

The contact tower, as has previously been stated, may be of any suitable type for providing tortuous flow and exposing adequate contact surface to the chlorine gas.

We claim:

1. The method of preparing liquid chlorine at substantially atmospheric pressure, which comprises cooling a stream of chlorine gas to a temperature between —20° C. and —32° C., passing the cooled gas stream through a liquid separating chamber, and further cooling the resultant purified gas stream to a temperature below about —40° C. at said pressure.

2. The method of preparing liquid chlorine from chlorine gas at substantially atmospheric pressure, which comprises passing a stream of the chlorine gas through a cooler so as to lower the temperature of the stream to between —20° C. and —25° C., passing this cooled gas stream upwardly through a chamber wherein the gas stream is subjected to tortuous flow and is exposed to a large contact surface so as to separate condensate therefrom, introducing the purified gas stream into a second cooler to further reduce its temperature to about —40° C. at said pressure whereby the chlorine gas is liquefied, and withdrawing the liquid chlorine from said cooler.

3. The method of preparing liquid chlorine substantially free of impurities from chlorine gas containing impurities formed in the course of manufacture and transportation thereof, which comprises passing the impure chlorine gas successively through a cooling zone so regulated that the gas is cooled to a temperature between its liquefaction temperature at the operating pressure and 30 centigrade degrees thereabove whereby the impurities are converted to the form of mist, and through a separating device to mechanically separate the mist from the gas, and then further cooling the resultant purified gas stream to liquefaction temperature of chlorine at the operating pressure.

JOHN W. HAYES.
ALOIS J. KALLFELZ.